United States Patent
Clarke

(10) Patent No.: US 11,322,956 B2
(45) Date of Patent: May 3, 2022

(54) SMARTPHONE CHARGER, STAND, AND RING HOLDER DEVICE

(71) Applicant: Rolston Clarke, Ontario, CA (US)

(72) Inventor: Rolston Clarke, Ontario, CA (US)

( * ) Notice: Subject to any disclaimer, the term of this patent is extended or adjusted under 35 U.S.C. 154(b) by 165 days.

(21) Appl. No.: 16/907,847

(22) Filed: Jun. 22, 2020

(65) Prior Publication Data

US 2021/0399565 A1     Dec. 23, 2021

(51) Int. Cl.
| | |
|---|---|
| *H01M 10/46* | (2006.01) |
| *H02J 7/00* | (2006.01) |
| *H04B 1/3877* | (2015.01) |

(52) U.S. Cl.
CPC .......... *H02J 7/0044* (2013.01); *H04B 1/3877* (2013.01)

(58) Field of Classification Search
CPC ...... H02J 7/0042; H02J 7/0044; H04B 1/3877
USPC .......................................... 320/107, 114, 115
See application file for complete search history.

(56) References Cited

U.S. PATENT DOCUMENTS

| | | | | |
|---|---|---|---|---|
| 2016/0141898 | A1* | 5/2016 | Riphin | H02J 7/34 320/114 |
| 2018/0102655 | A1* | 4/2018 | Miller | F21L 4/08 |
| 2020/0112205 | A1* | 4/2020 | Weisband | H02J 7/0042 |

FOREIGN PATENT DOCUMENTS

| | | | | |
|---|---|---|---|---|
| GB | 2508729 A | * | 6/2014 | H02J 7/0044 |

* cited by examiner

*Primary Examiner* — Edward Tso
(74) *Attorney, Agent, or Firm* — Pharar Patents & Intellectual Property; Andrew A. Pharar

(57) ABSTRACT

The smartphone charger, stand, and ring holder device may allow a user to charge their smart device whenever necessary, position their smart device so that it may stand independently, or more securely hold on to their smart device when carrying it. The device can be attached to the back surface of a smartphone or other smart device, and has a device connector that plugs into the smart device and a charging connector that plugs into a power source. The device also has a kickstand cover that covers the various connectors and can be opened to allow the smart device to stand independently. A ring holder is integrated into the outer cover of the device and may be articulated outwards to allow a user to more securely hold the device and, thus, their smart device. The combination may further integrate a capacitor or battery for providing power storage.

20 Claims, 8 Drawing Sheets

SMARTPHONE CHARGER, STAND, AND RING HOLDER DEVICE

TECHNICAL FIELD OF THE INVENTION

The present invention relates in general to smartphone accessories, and, more specifically, to a smartphone charger, stand, and ring holder device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A smart device is an electronic computing device that is wirelessly connected to other devices so that it may perform functions both interactively and independently. Various examples of smart devices include tablets, cars, appliances, watches, thermostats, and speakers. The most popular form of smart devices, though, may be smartphones.

More than 2.7 billion smartphones are in use around the world because of the functionality and convenience they provide. Users of smartphones are able to use the devices for making mobile phone calls over cellular and digital networks, as well as perform a number of various functions through a plethora of mobile software applications. Users of smartphones may even play games or watch movies via their device, and are able to stay in contact with others in real time.

Due to their generally rectangular and slim shape the carrying and positioning of smartphones for use or for viewing is occasionally difficult. Smartphones often slip and fall out of a user's pocket or hand during movement and it is often complicated and sometimes impossible to make them stand independently, whether vertically or horizontally.

A number of solutions have been created to remedy such difficulties with smartphones and other smart devices. For assistance with holding a smartphone, for example, smartphone cases with additional texture or gripping surfaces may allow a user to have extra traction on the device. Other devices that may be adhered to the back surface of a smartphone may pop out and allow a user to grip and hold the smartphone between their fingers.

For allowing a smartphone or other smart device to stand independently various holders, usually with triangulated legs and some form of support or attachment structure, have been designed. These devices, though, often come in a form factor that is not convenient for carrying in a pocket and are independent from the smart device itself. Even those devices attached to a smartphone or smart device, such as an integrated kickstand or an attached lever arm, only serve to prop up the device though obscure area on the back surface of the device for other attachments.

Yet another issue with smartphones and other smart devices is that they require a power source for operating and recharging. The integrated battery in various, especially newer, smart devices is usually sufficient to operate the device for a day or two, but the device will eventually need to be recharged and such recharging necessarily requires the use of a charging cable. Should the user have forgotten to bring or otherwise misplaced their charging cable, recharging of the smart device may not be possible.

No solution exists that integrates a smartphone or smart device charging mechanism, positioning stand, and holding device into a single, compact design that is conveniently carried by a user. Such a device may be attached to the user's smartphone or other smart device so that it is always available to the user and so as to minimize the risk of a user being without the various provided functions.

Thus, there is a need in the art for a smartphone charger, stand, and ring holder device that may allow a user to charge their smart device whenever necessary, position their smart device so that it may stand independently, or more securely hold on to their smart device when carrying it.

BRIEF SUMMARY OF THE INVENTION

To minimize the limitations in the prior art, and to minimize other limitations that will be apparent upon reading and understanding the present specification, the present invention describes a smartphone charger, stand, and ring holder device.

It is an objective of the present invention to provide a smartphone charger, stand, and ring holder device that may comprise a smart device accessory.

It is another objective of the present invention to provide a smartphone charger, stand, and ring holder device that may comprise a smart device attachment.

It is another objective of the present invention to provide a smartphone charger, stand, and ring holder device that may comprise a body shell.

It is another objective of the present invention to provide a smartphone charger, stand, and ring holder device that may comprise a cable mechanism.

It is another objective of the present invention to provide a smartphone charger, stand, and ring holder device that may comprise an upper shell.

It is another objective of the present invention to provide a smartphone charger, stand, and ring holder device that may comprise a mounting plate.

It is another objective of the present invention to provide a smartphone charger, stand, and ring holder device that may comprise a kick stand cover.

It is another objective of the present invention to provide a smartphone charger, stand, and ring holder device that may comprise a ring holder.

It is another objective of the present invention to provide a smartphone charger, stand, and ring holder device that may comprise a charging cable.

It is another objective of the present invention to provide a smartphone charger, stand, and ring holder device that may comprise a retraction mechanism.

It is another objective of the present invention to provide a smartphone charger, stand, and ring holder device that may comprise a charging connector.

It is another objective of the present invention to provide a smartphone charger, stand, and ring holder device that may comprise a device connector.

It is another objective of the present invention to provide a smartphone charger, stand, and ring holder device that may comprise a flexible cable.

It is another objective of the present invention to provide a smartphone charger, stand, and ring holder device that may comprise an electrical junction.

It is another objective of the present invention to provide a smartphone charger, stand, and ring holder device that may comprise a resilient material of construction.

It is another objective of the present invention to provide a smartphone charger, stand, and ring holder device that may comprise a water-proof material of construction.

It is another objective of the present invention to provide a smartphone charger, stand, and ring holder device that may comprise a reusable material of construction.

It is another objective of the present invention to provide a smartphone charger, stand, and ring holder device that may comprise a washable material of construction.

It is another objective of the present invention to provide a smartphone charger, stand, and ring holder device that may comprise a multi-component construction.

It is another objective of the present invention to provide a smartphone charger, stand, and ring holder device that may comprise an antimicrobial layer.

It is another objective of the present invention to provide a smartphone charger, stand, and ring holder device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The smartphone charger, stand, and ring holder device may allow a user to charge their smart device whenever necessary, position their smart device so that it may stand independently, or more securely hold on to their smart device when carrying it. The device can be attached to the back surface of a smartphone or other smart device, and has a device connector that plugs into the smart device and a charging connector that plugs into a power source. The device also has a kickstand cover that covers the various connectors and can be opened to allow the smart device to stand independently. A ring holder is integrated into the outer cover of the device and may be articulated outwards to allow a user to more securely hold the device and, thus, their smart device. The combination may further integrate a capacitor or battery for providing power storage.

Figure 1:
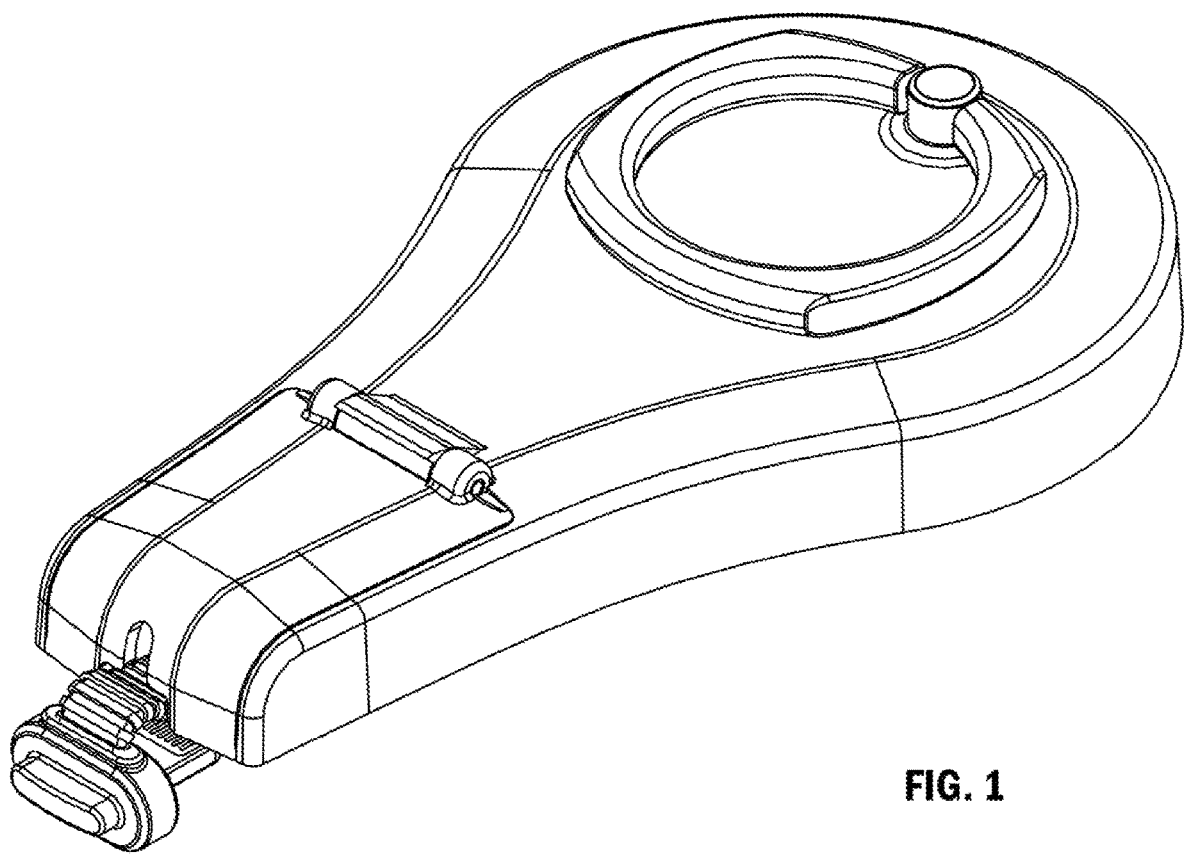
FIG. 1 is an isometric perspective view of a smartphone charger, stand, and ring holder device, as contemplated by the present disclosure.
Figure 2:
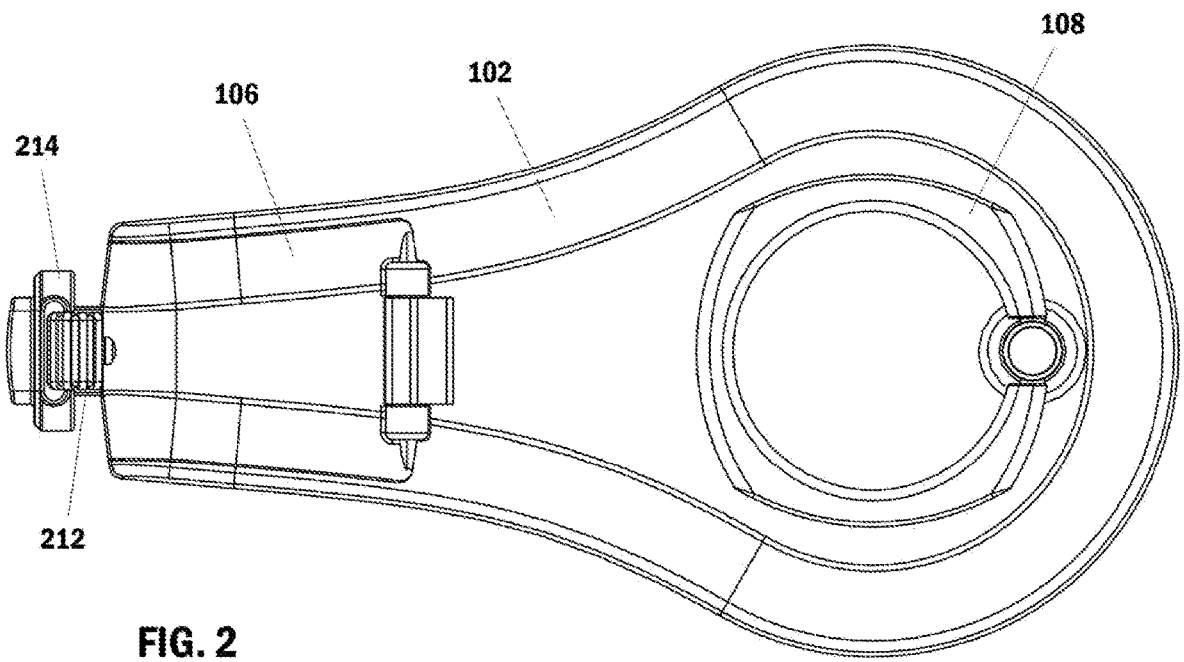
FIG. 2 is a top plan view of a smartphone charger, stand, and ring holder device, as contemplated by the present disclosure.
Figure 3:
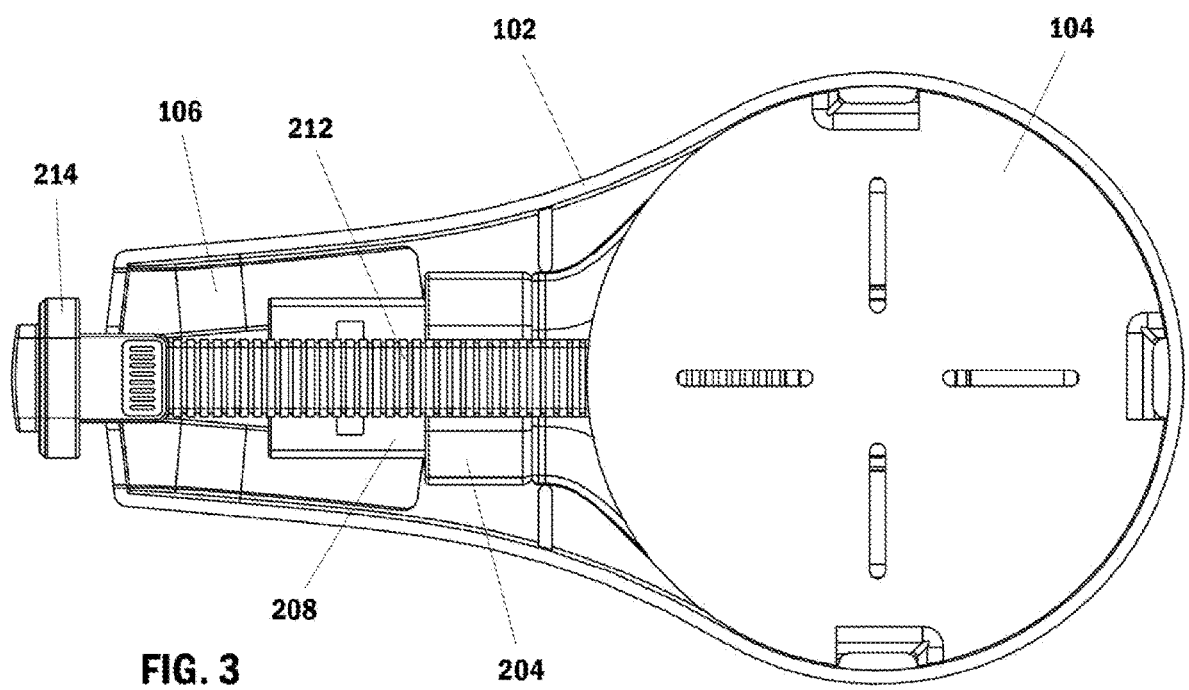
FIG. 3 is a bottom plan view of a smartphone charger, stand, and ring holder device, as contemplated by the present disclosure.
Figure 4:
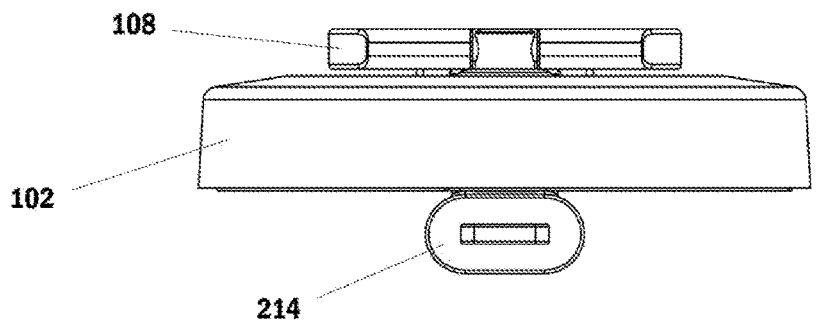
FIG. 4 is a rear perspective view of a smartphone charger, stand, and ring holder device, as contemplated by the present disclosure.
Figure 5:
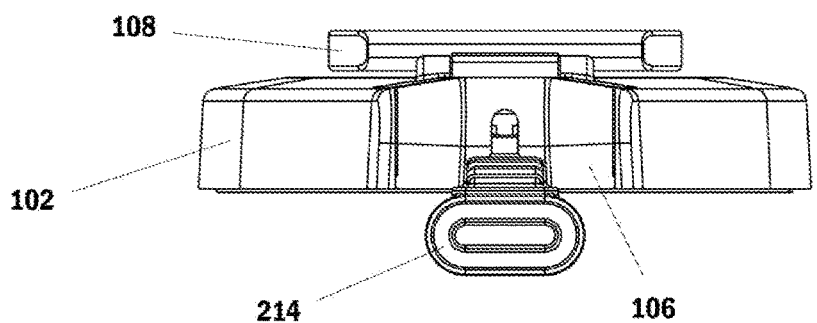
FIG. 5 is a front perspective view of a smartphone charger, stand, and ring holder device, as contemplated by the present disclosure.
Figure 6:
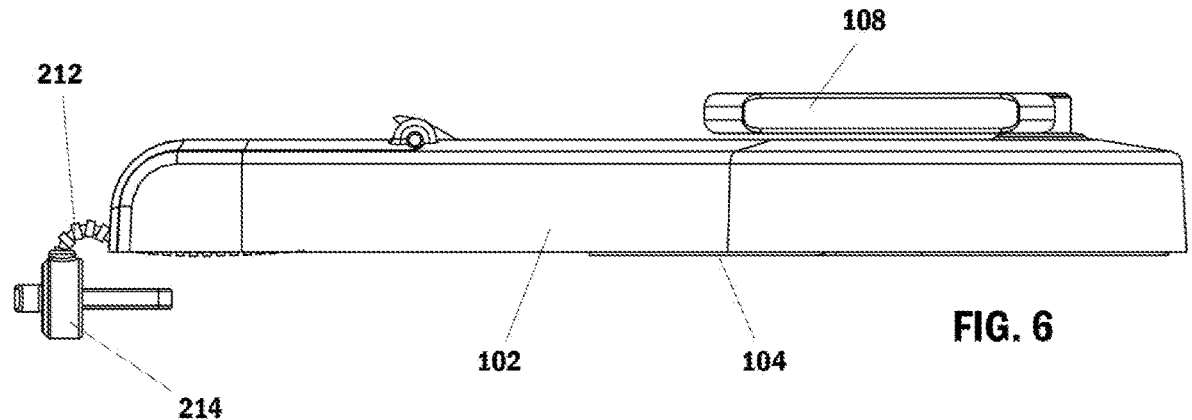
FIG. 6 is a left side elevation view of a smartphone charger, stand, and ring holder device, as contemplated by the present disclosure.
Figure 7:
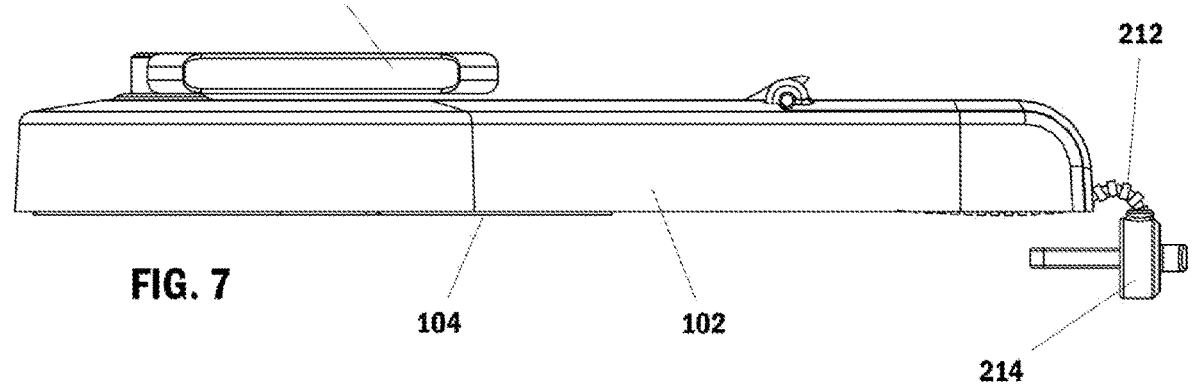
FIG. 7 is a right side elevation view of a smartphone charger, stand, and ring holder device, as contemplated by the present disclosure.
Figure 8:
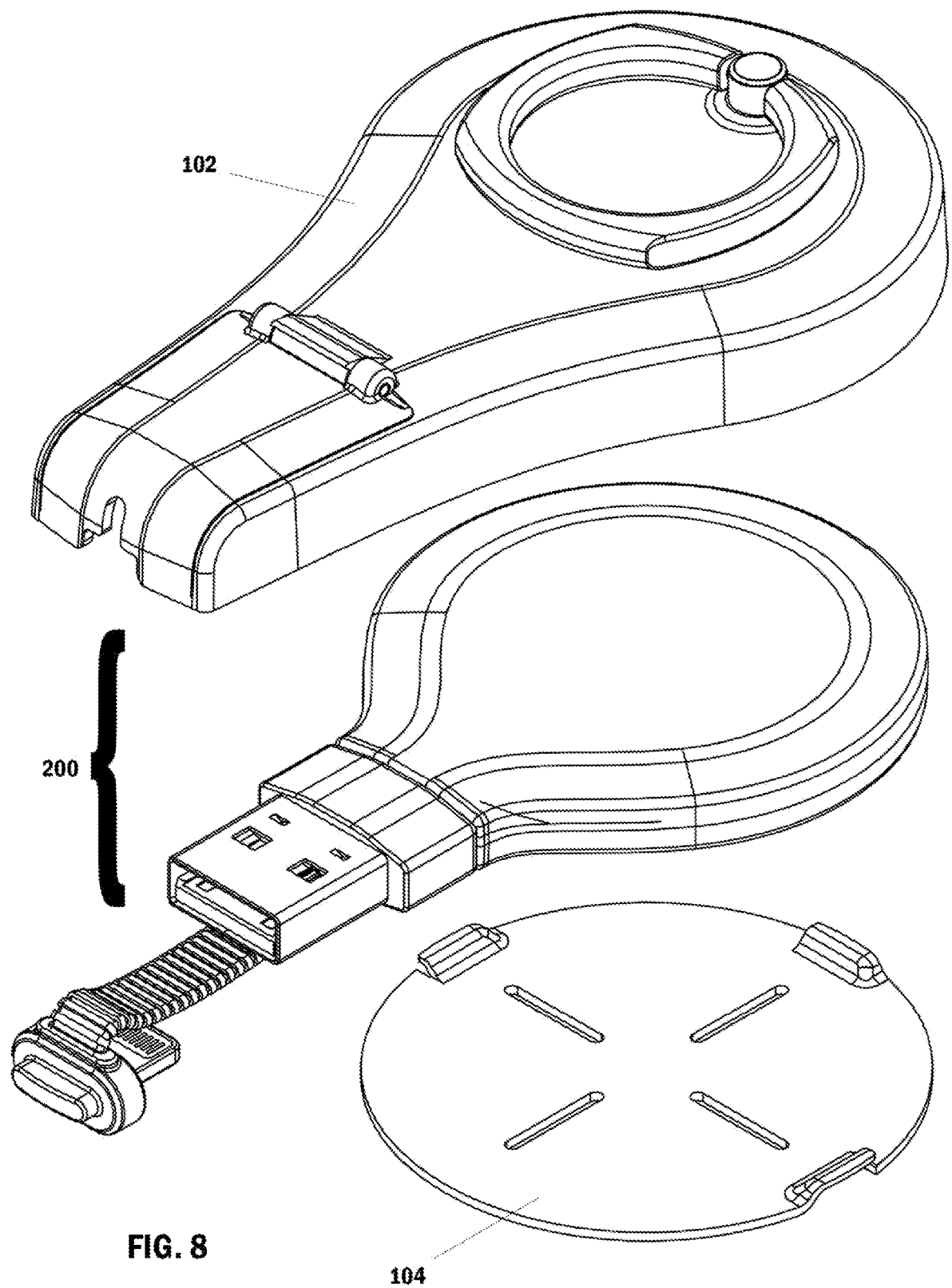
FIG. 8 is an isometric perspective view of a smartphone charger, stand, and ring holder device showing a cable mechanism contained within a body shell, as contemplated by the present disclosure.
Figure 9:
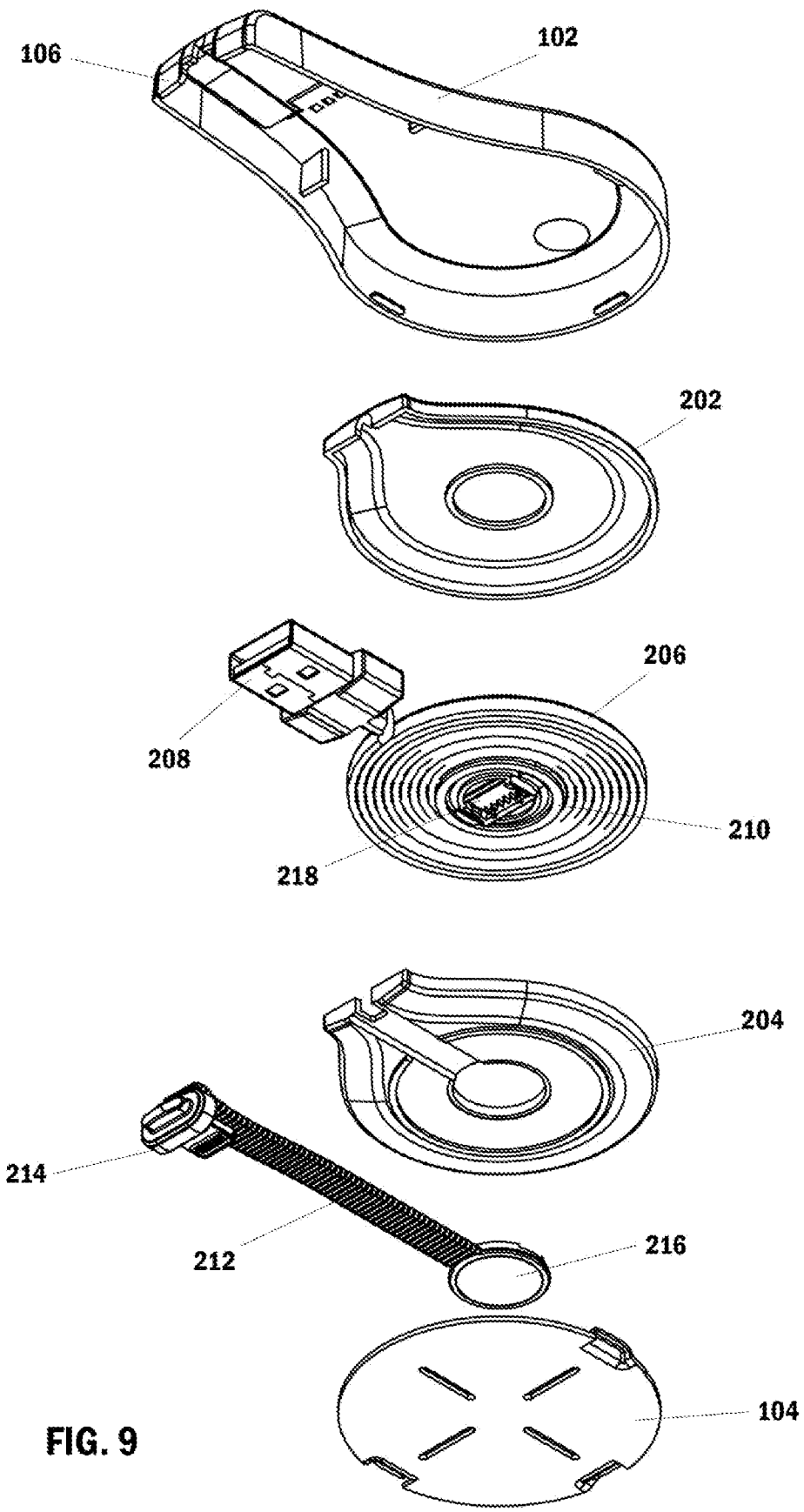
FIG. 9 is an exploded component view of a smartphone charger, stand, and ring holder device, as contemplated by the present disclosure.
Figure 10:
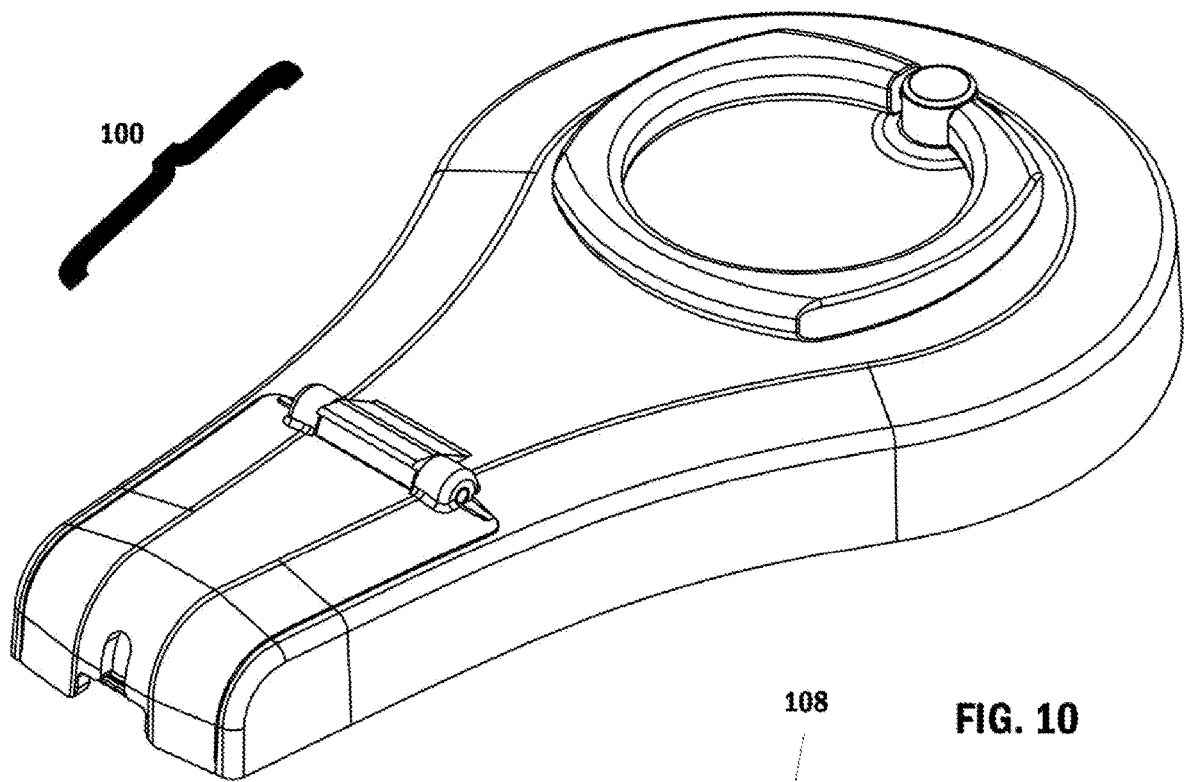
FIG. 10 is an isometric perspective view of a smartphone charger, stand, and ring holder device with its device connector retracted, as contemplated by the present disclosure.
Figure 11:
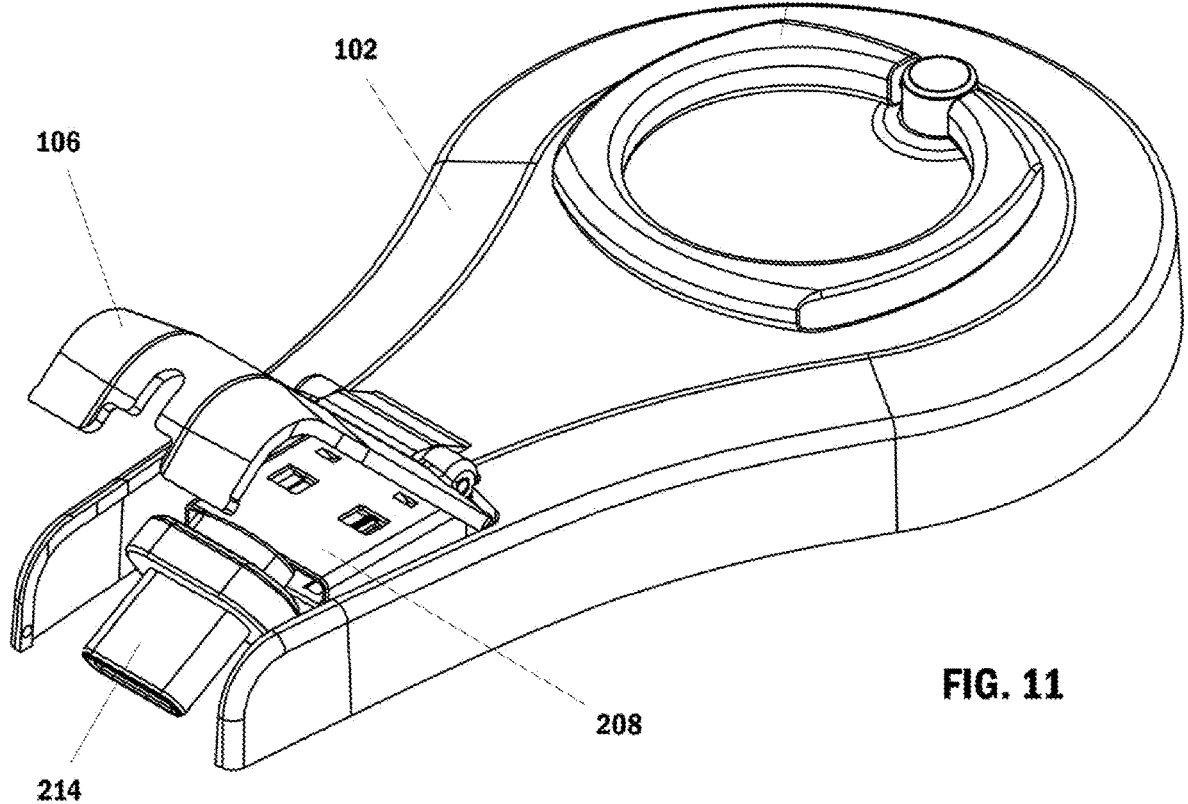
FIG. 11 is an isometric perspective view of a smartphone charger, stand, and ring holder device with its kickstand cover open, as contemplated by the present disclosure.
Figure 12:
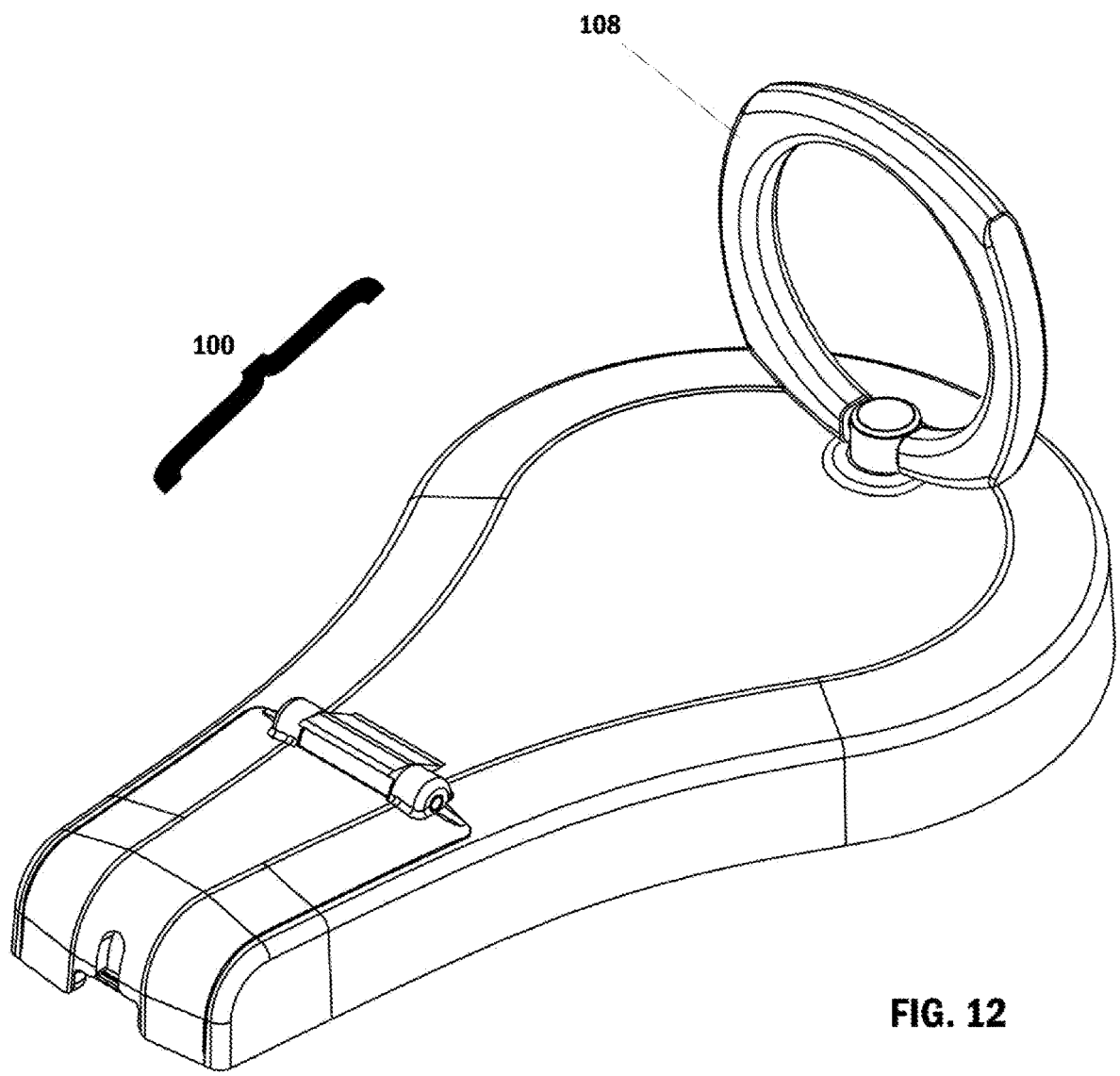
FIG. 12 is an isometric perspective view of a smartphone charger, stand, and ring holder device with its ring holder extended, as contemplated by the present disclosure.
Figure 13:
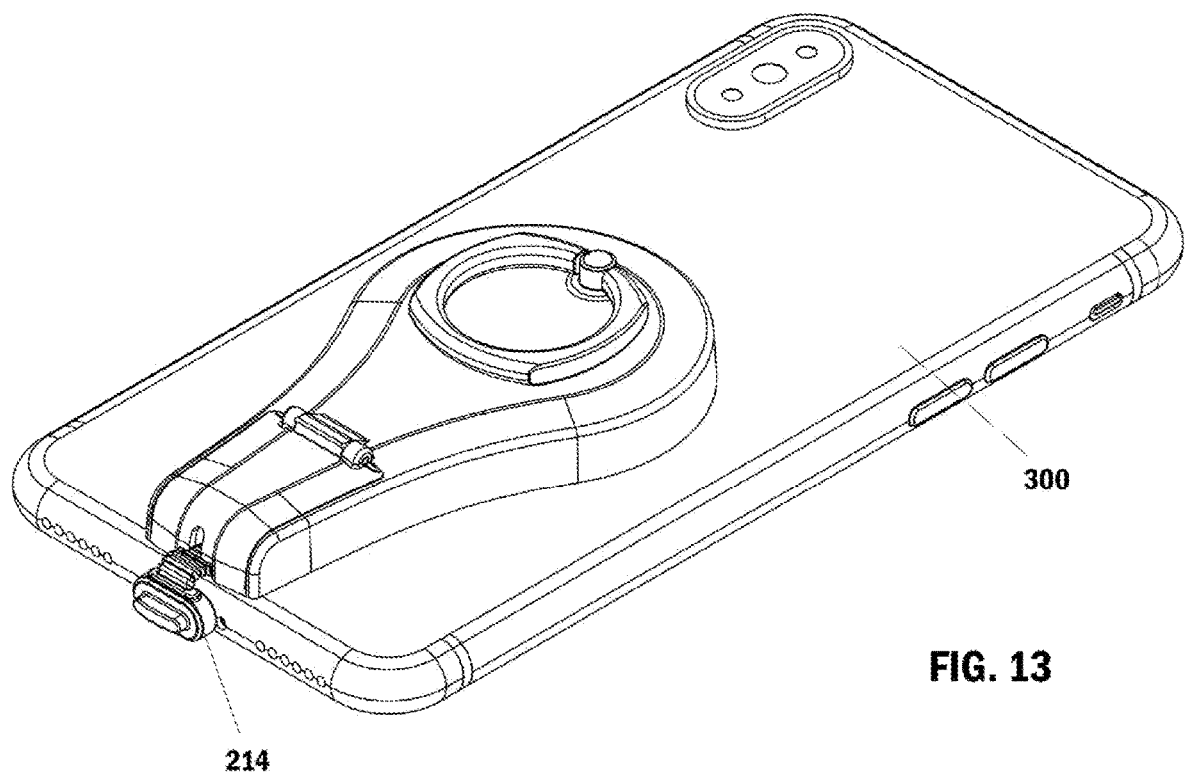
FIG. 13 is an isometric perspective view of a smartphone charger, stand, and ring holder device attached to an exemplary smartphone, as contemplated by the present disclosure.
Figure 14:
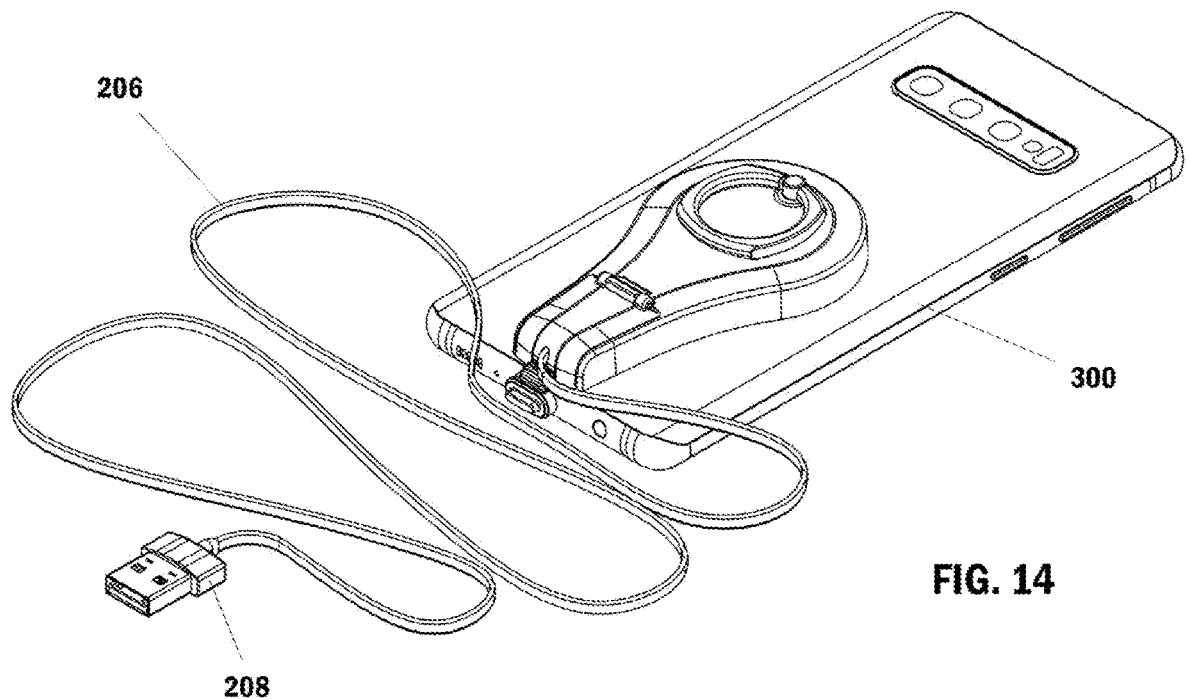
FIG. 14 is an isometric perspective view of a smartphone charger, stand, and ring holder device attached to an exemplary smartphone with its charging cable extended, as contemplated by the present disclosure.

The illustrations of FIGS. 1-14 illustrate a smartphone charger, stand, and ring holder device, as contemplated by the present disclosure. The device may comprise, generally, a body shell 100 enclosing a cable mechanism 200. The body shell 100 may generally comprise two main components, namely an upper component that may be called an upper shell 102 and a lower component that may be called a mounting plate 104.

The upper shell 102 may comprise any appropriately shaped cover having a horizontal surface with an upper side and a lower side, a perimeter surface having a height, and a central cavity. The mounting plate 104 may comprise any appropriately shaped cover substantially matching the shape of the upper shell 102 and having a horizontal surface with an upper side and a lower side. The upper shell 102 and mounting plate 104 may further comprise complementary halves of any appropriate attachment mechanism such as, for example, a magnetic bond, a friction fit, a snap fit, or a spring-loaded mechanism. By this mechanism the upper shell 102 and mounting plate 104 may be reversibly attached to one another such that they form a body shell 100 enclosing the cable mechanism 200 with the upper side of the mounting plate 104 and lower side of the horizontal surface of the upper shell 102 facing inwards.

The lower side of the mounting plate 104 may further comprise an attachment mechanism appropriate for reversibly attaching the smartphone charger, stand, and ring holder device to an exemplary smartphone 300 such as, for example, a magnetic bond, a double-sided tape, an adhesive sheet, or a suction cup mechanism. By this mechanism the mounting plate 104 may be reversibly attached the exemplary smartphone 300 such that the two devices remain attached as desired by a user of the device.

The upper shell 102 may further comprise a kickstand cover 106, which may be any appropriately shaped cover attached to the upper shell 102 by an articulating mechanism. Such an articulating mechanism may comprise any appropriate articulating mechanism such as, for example, a butt hinge, a knife hinge, a piano hinge, or a pivot hinge.

The kickstand cover 106 may further comprise an appropriate articulation limiting mechanism and a locking mechanism so that the kickstand cover 106 may articulate only through a limited arc of movement and may stay in a given position when desired by a user of the device. Such a limiting mechanism may be any appropriate mechanism such as, for example, a plurality of tabs, a limiting spring, or a limiting fabric. Such a locking mechanism may be any appropriate mechanism such as, for example, notches within the articulating mechanism, a pneumatic arm, or a positionable strut.

The upper shell 102 may further comprise a ring holder 108, which may be any appropriately shaped ring attached to the upper shell 102 by an articulating mechanism. Such an articulating mechanism may comprise any appropriate articulating mechanism such as, for example, a rotating post, a rotating rivet, or a rotating post hasp.

The ring holder 108 may further comprise an appropriate articulation limiting mechanism and a locking mechanism so that the ring holder 108 may articulate only through a limited arc of movement and may stay in a given position when desired by a user of the device. Such a limiting mechanism may be any appropriate mechanism such as, for example, a plurality of tabs, a limiting spring, or a limiting fabric. Such a locking mechanism may be any appropriate mechanism such as, for example, notches within the articulating mechanism, a pneumatic arm, or a positionable strut.

In one embodiment of the smartphone charger, stand, and ring holder device the upper shell 102 may comprise a substantially teardrop shape and the mounting plate 104 may comprise a substantially circular shape that fits within a circular area of the upper shell 102. The kickstand cover 106 may comprise an articulating cover attached to or comprising the teardrop end of the upper shell 102 and allowing a user access to the central cavity of the upper shell 102 when opened. The ring holder 108 may comprise an articulating ring attached to the upper side of the horizontal surface of the upper shell 102 and allowing a user to hold the smartphone charger, stand, and ring holder by placing one or more fingers into and around the ring holder 108.

The cable mechanism 200 may generally comprise a cable upper cover 202, a cable lower cover 204, a charging cable 206, and a flexible cable 212. The cable upper cover 202 may comprise any appropriately shaped cover having a horizontal surface with an upper side and a lower side, a perimeter surface having a height, and a central cavity. The cable lower cover 204 may comprise any appropriately shaped cover having a horizontal surface with an upper side and a lower side, a perimeter surface having a height, and a central cavity.

The cable upper cover 202 and cable lower cover 204 may further comprise complementary halves of any appropriate attachment mechanism such as, for example, a magnetic bond, a friction fit, a snap fit, or a spring-loaded mechanism. By this mechanism the cable upper cover 202 and cable lower cover 204 may be reversibly attached to one another such that they form a combination enclosing the charging cable 206 with the upper side of the cable lower cover 204 and lower side of the cable upper cover 202 facing inwards.

The charging cable 206 may comprise any cable appropriate for transmitting an electrical signal or an electrical charge, and may further comprise a first end and a second end. The first end of the charging cable 206 may be attached to a charging connector 208, and the second end of the charging cable 206 may be attached to a second connector half 218. The attachment of the charging cable 206 to the charging connector 208 and second connector half 218 may be any appropriate electrical connection such as, for example, soldering, welding, crimping, or intertwining.

The flexible cable 212 may comprise any cable appropriate for transmitting an electrical signal or an electrical charge, and may further comprise a first end and a second end. The first end of the flexible cable 212 may be attached to a device connector 214, and the second end of the flexible cable 212 may be attached to a first connector half 216. The attachment of the flexible cable 212 to the device connector 214 and first connector half 216 may be any appropriate electrical connection such as, for example, soldering, welding, crimping, or intertwining.

The charging connector 208 and device connector 214 may each comprise any connector appropriate for connecting to and interfacing with another device such as, for example, a power adapter, an exemplary smartphone 300, or a smart device. Such connectors may comprise, for example, a plug and socket system such as universal serial bus (USB) connectors, high-definition multimedia interface (HDMI) connectors, or digital visual interface (DVI) connectors. The various connectors used may further comprise a subtype of the exemplary connectors such as, for example, USB type A connectors, USB type C connectors, micro USB connectors, lightning connectors, and the like.

The first connector half 216 and second connector half 218 may each comprise complementary halves of any connector appropriate for creating Such connectors may comprise, for example, a plug and socket system such as male and female Japan solderless terminal (JST) connectors, molex connectors, or picoblade connectors.

The first connector half 216 and second connector half 218 of the cable mechanism 200 may be connected to one another so as to form a continuous electrical connection between the charging connector 208 and the device connector 214 via the charging cable 206 and the flexible cable 212. The charging connector 208 may be plugged into a power source and the device connector 214 may be plugged into an exemplary smartphone 300 or other smart device such that electrical power is transmitted from the power source to the exemplary smartphone 300 for charging or recharging.

The charging cable 206 may be wrapped around a retraction mechanism 210 contained within the cable mechanism 200. The retraction mechanism 210 may comprise any appropriate mechanism for retracting the charging cable 206 into the cable mechanism 200 and winding the charging cable 206 around the retraction mechanism 210. The retraction mechanism 210 may further provide some resistance against unwinding of the charging cable 206 from the cable mechanism 200. The retraction mechanism 210 may be an appropriate mechanism such as, for example, a torsion spring, a rotary spring, or a clock spring.

The smartphone charger, stand, and ring holder device may further comprise a capacitor or battery in continuous electrical connection to the cable mechanism 200. By this mechanism the device may store electrical power within itself or function as a secondary battery or mobile charging source for an exemplary smartphone 300.

The smartphone charger, stand, and ring holder device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the smartphone charger, stand, and ring holder device may be substantially constructed of one or more materials of silicone, plastic, acrylic, polycarbonate, steel, aluminum, brass, fiberglass, carbon fiber, or combinations thereof. In some embodiments the various components of the device may be coated, lined, or otherwise insulated to prevent contamination of the device. In one embodiment the material of construction may vary from one component to the next within the system.

In one embodiment the smartphone charger, stand, and ring holder device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A smartphone charger, stand, and ring holder device, comprising:
    an upper shell;
    a mounting plate;
    a charging cable;
    a flexible cable; and
    a retraction mechanism;
    wherein said upper shell is removably attached to said mounting plate;
    wherein said mounting plate further comprises a smartphone attachment mechanism;
    wherein said charging cable further comprises a first end and a second end;
    wherein said flexible cable further comprises a first end and a second end;
    wherein said second end of said charging cable is electrically attached to a second connector half;
    wherein said second end of said flexible cable is electrically attached to a first connector half;
    wherein said charging cable is electrically attached to said flexible cable by said first connector half and said second connector half;
    wherein said first end of said charging cable is electrically attached to a charging connector;
    wherein said first end of said flexible cable is electrically attached to a device connector; and
    wherein said charging cable is physically attached to said retraction mechanism.

2. The invention of claim 1, further comprising:
    a cable upper cover; and
    a cable lower cover;
    wherein said charging cable and said retraction mechanism are installed within a combination of said cable upper cover and said cable lower cover;
    wherein said charging connector protrudes out from said combination of said cable upper cover and said cable lower cover; and
    wherein said charging cable is electrically attached to said flexible cable by said first connector half and said second connector half through said combination of said cable upper cover and said cable lower cover.

3. The invention of claim 2, further comprising
    a kickstand cover;
    wherein said kickstand cover is articulably attached to said upper shell.

4. The invention of claim 3,
    wherein said kickstand cover may be reversibly articulated from a closed position to an open position; and
    wherein said charging cable may be reversibly moved from a retracted position to an extended position.

5. The invention of claim 4,
    wherein said kickstand cover covers said charging connector when said kickstand cover is in said closed position and said charging cable is in said retracted position.

6. The invention of claim 5,
    a ring holder;
    wherein said ring holder is articulably attached to said upper shell.

7. The invention of claim 6,
    wherein said smartphone attachment mechanism is a double-sided tape.

8. The invention of claim 6,
    wherein said smartphone attachment mechanism is an adhesive sheet.

9. The invention of claim 6,
    wherein said smartphone attachment mechanism is a suction cup.

10. The invention of claim 6,
    wherein said first connector half and said second connector half each comprise a complementary half of a JST connector.

11. The invention of claim 6,
    wherein said charging connector comprises a USB type A connector.

12. The invention of claim 6,
    wherein said charging connector comprises a USB type C connector.

13. The invention of claim 6,
wherein said charging connector comprises a micro USB connector.
14. The invention of claim 6,
wherein said charging connector comprises a lightning connector.
15. The invention of claim 6,
wherein said device connector comprises a USB type A connector.
16. The invention of claim 6,
wherein said device connector comprises a USB type C connector.
17. The invention of claim 6,
wherein said device connector comprises a micro USB connector.
18. The invention of claim 6,
wherein said device connector comprises a lightning connector.
19. The invention of claim 6,
wherein said retraction mechanism comprises a torsion spring.
20. The invention of claim 6,
wherein said retraction mechanism comprises a rotary spring.

* * * * *